Nov. 28, 1933.   R. THOMSON   1,936,696
MEANS FOR CUTTING EXTERNAL SCREW THREADS
Original Filed April 7, 1930   3 Sheets-Sheet 1
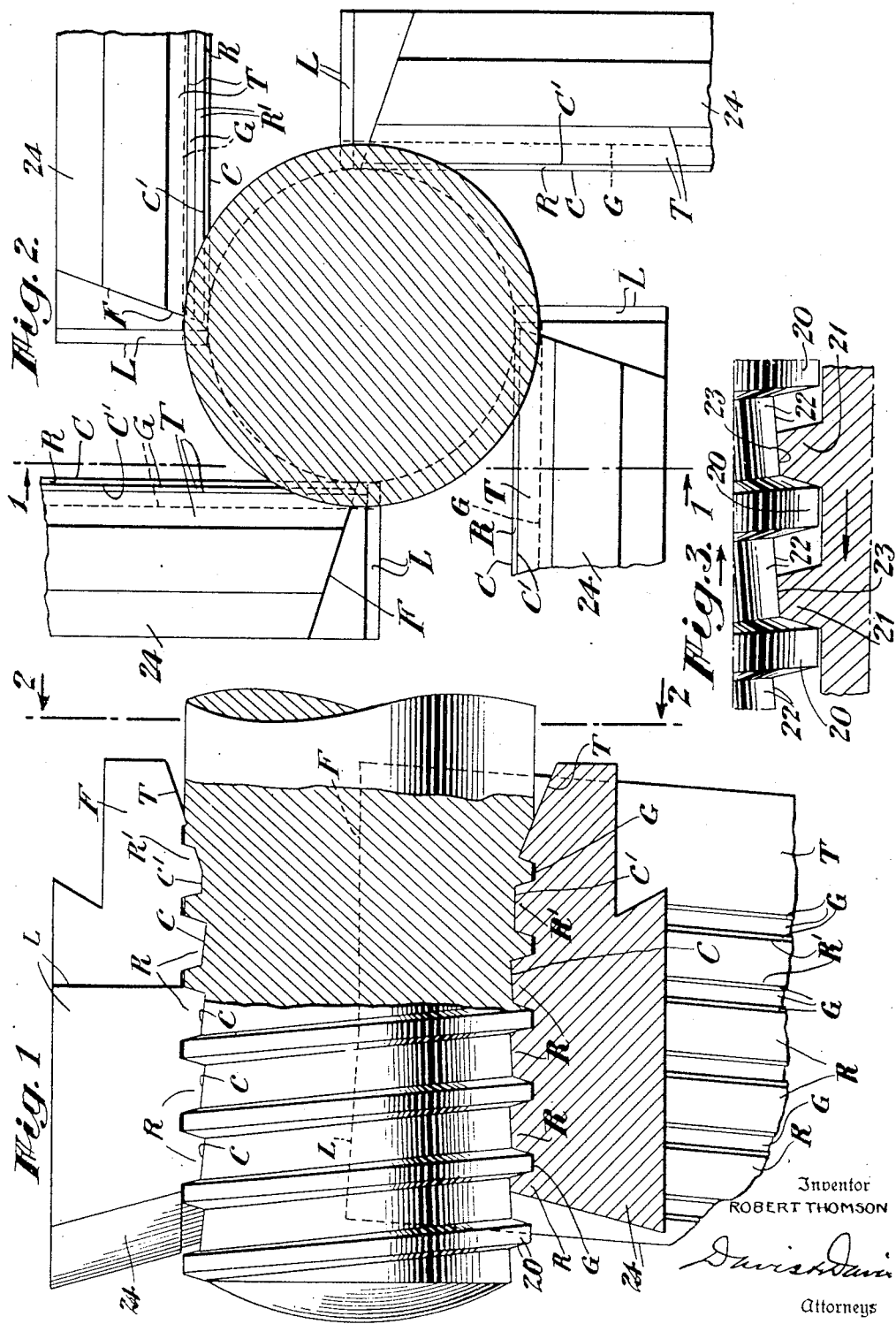

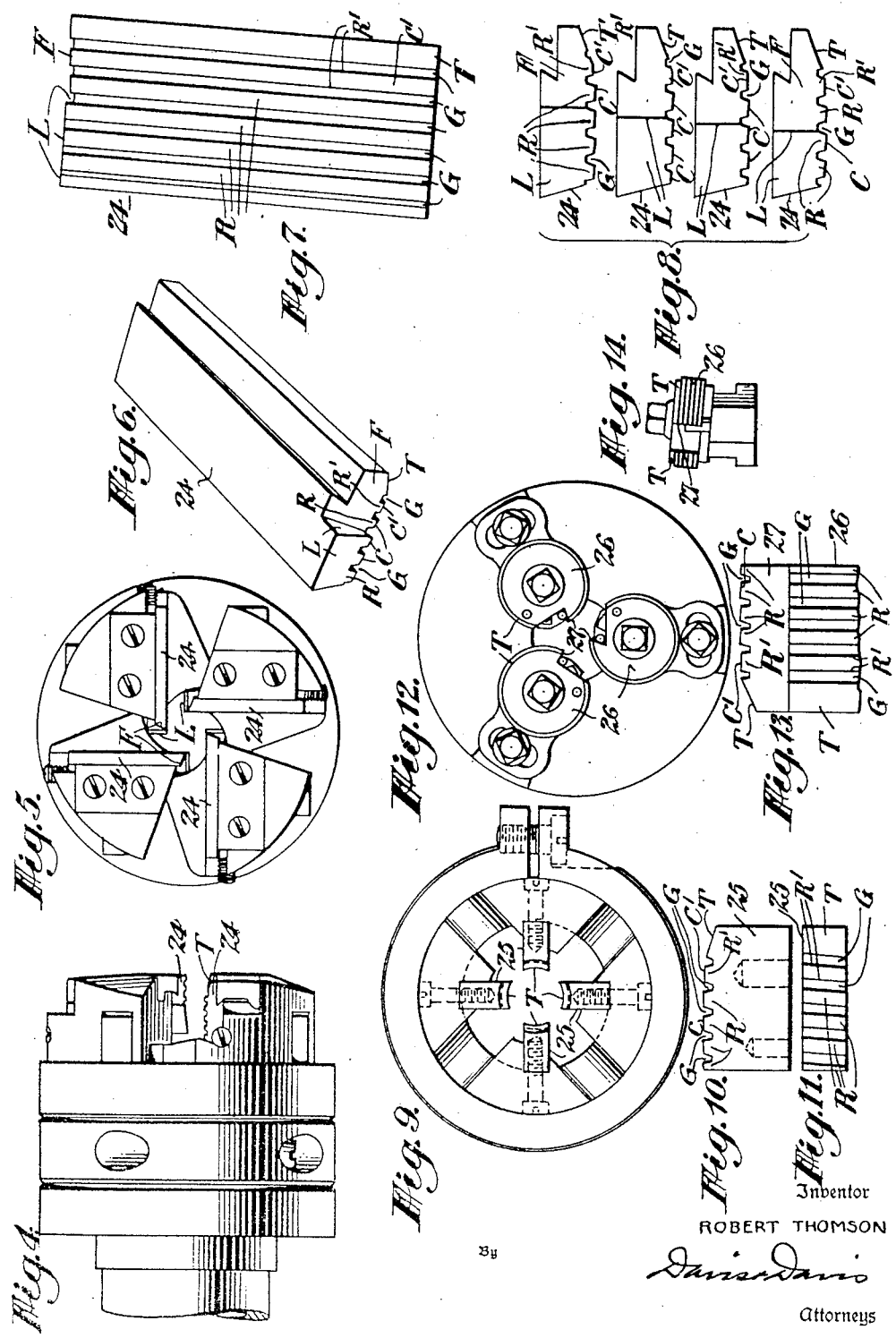

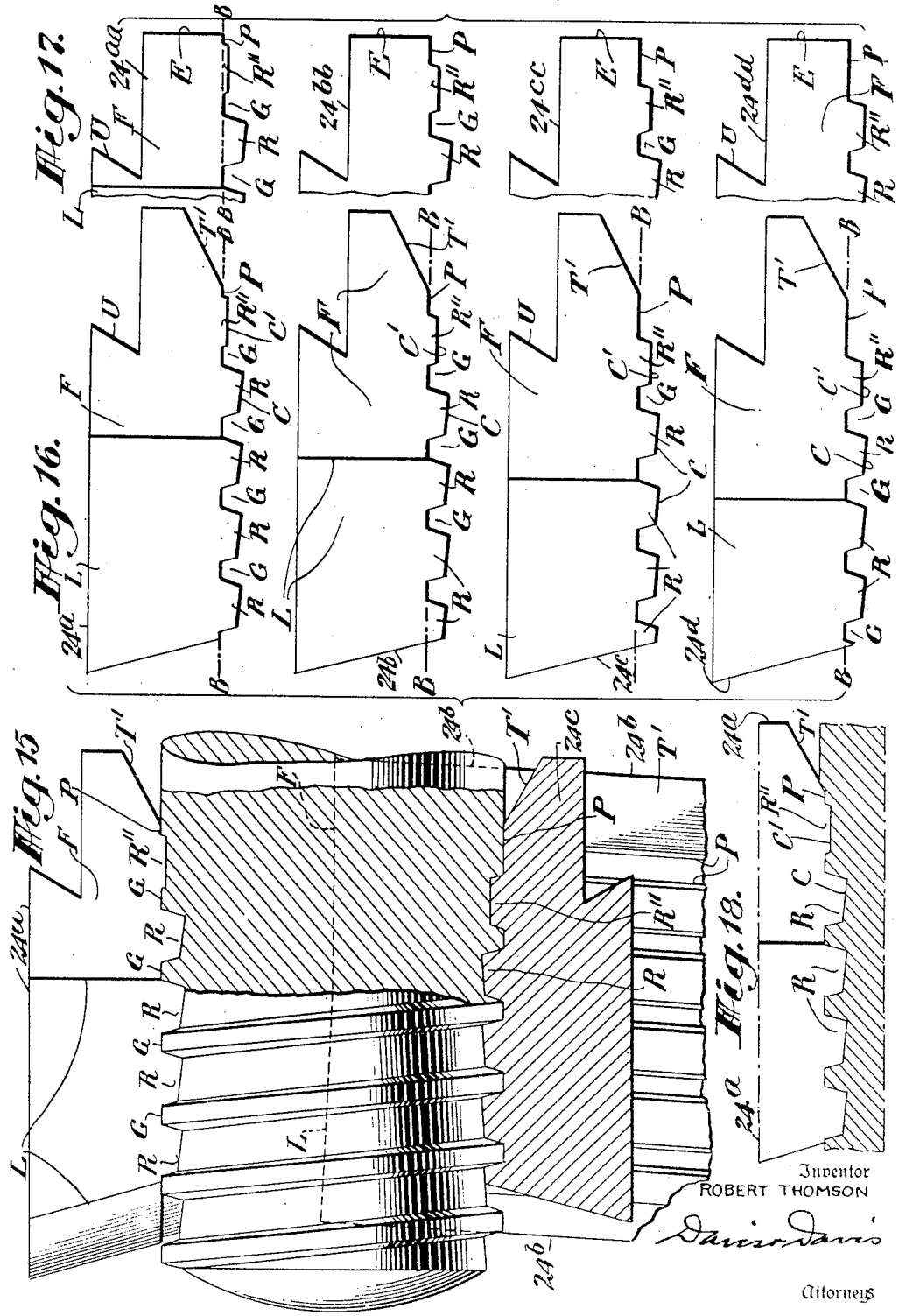

Patented Nov. 28, 1933

1,936,696

UNITED STATES PATENT OFFICE 1,936,696

MEANS FOR CUTTING EXTERNAL SCREW THREADS

Robert Thomson, Arlington, N. J., assignor to Dardelet Threadlock Corporation, New York, N. Y., a corporation of Delaware Continuation of applications Serial No. 415,742, December 21, 1929, and Serial No. 442,224, April 7, 1930. This application May 6, 1932. Serial No. 609,746

23 Claims. (Cl. 10—111)

This invention relates to improvements in means for cutting external screw threads, the improvements being especially applicable to cutting such threads by means of a screw threading die, and being especially useful in cutting external threads of the kind known as Dardelet self-locking screw threads.

Important objects of the present invention are to provide improved means for cutting external screw threads (including Dardelet self-locking threads) whereby the cut threads will be true as to pitch and profile, will not be cut "out of round", and may be cut with ease, expedition and economy without sacrificing accuracy of formation. Other important objects of the invention are to provide improved means (including improved die chasers or cutter elements) capable of embodiment in various known types of dies for use in die-cutting external threads (including Dardelet self-locking threads) with accuracy, speed and economy without the setting up of injurious relative radial, axial, or both radial and axial, vibrations between the die and the piece being threaded.

The invention also includes among its purpose the provision of a thread chasing die for chasing or cutting a complete external Dardelet self-locking thread at a single operation without cutting the thread out of round (i. e. without cutting a thread varying in radial displacement from the thread axis as it winds about said axis), and without cutting the thread either out of pitch or with a distorted or varying profile.

The invention also includes among its purposes the provision of a die for completely cutting an external Dardelet thread which has a finished or perfect profile up to a point within one turn of the inner end of the cut made by the die in the threaded piece; the provision of means for accurately cutting an external Dardelet thread on rough commercial pieces which vary somewhat from a nominal diameter; and the provision of an efficient die for cutting an external Dardelet thread close up to a shoulder on a shouldered piece.

In the accompanying drawings, wherein the invention is shown embodied in several forms of devices for cutting external Dardelet screw threads, Fig. 1 is a fragmentary sectional view approximately on the line 1—1 of Fig. 2, showing a bolt thread being chased by the chasers of a die which is further illustrated in Figs. 2, 4 and 5;

Fig. 2 is a fragmentary sectional view on the line 2—2 of Fig. 1;

Fig. 3 is a fragmentary view, partly in longitudinal section, of a bolt and nut provided with Dardelet self-locking threads, the nut and bolt threads being shown in locked relation;

Fig. 4 is a view showing in side elevation a well-known type of die as improved by the embodiment therein of one form of the invention;

Fig. 5 is a view of the leading or entering end of the improved die shown in Figs. 1, 2 and 4;

Fig. 6 is a perspective view of one of the chasers of said die;

Fig. 7 is a plan view of the grooved face of one of said chasers;

Fig. 8 is a view showing the active or cutting ends of the several chasers of the set of four chasers in said die;

Fig. 9 is a view of the leading or entering end of an improved construction of another well-known type of die in which one form of the invention is embodied;

Fig. 10 is a side view of one of the chasers of the improved die shown in Fig. 9;

Fig. 11 is a view of the ribbed face of the chaser shown in Fig. 10;

Fig. 12 is a view of the leading or entering end of an improved construction of another well-known type of die in which one form of the invention is embodied;

Fig. 13 is a fragmentary view of one of the chasers of the die shown in Fig. 12, as it appears when looking directly at the cutting face of the chaser;

Fig. 14 is a detail view showing the mounting of chasers in the die illustrated in Fig. 12;

Figs. 15 and 16 are views similar to Figs. 1 and 8, respectively, showing a modification of the improved threading die disclosed in Figs. 1, 2, 4, 5, 6, 7 and 8;

Fig. 17 is a view showing a modified construction of the improved set of chasers disclosed in Fig. 16; and Fig. 18 is a fragmentary sectional view on the same line as Figs. 1 and 15, showing how the chasers of the modified form of die illustrated in Fig. 15 act on slightly oversize stock, the particular chaser shown in Fig. 18 being the uppermost chaser appearing in Fig. 15.

In the commercial Dardelet system of screw threading, the external and internal threads, as of a bolt and nut for example, have the forms shown in Fig. 3, and are of equal pitch. As shown, the rib 20 of the bolt thread and the rib 21 of the nut thread have steep side walls making an angle of 14½ degrees with the perpendicular to the thread axis, said ribs being much narrower than the thread grooves. The bolt thread has a slightly conoidal root surface 22 making an angle of six degrees with the thread axis, upon which root surface the correspondingly conoidal crest surface 23 of the nut thread becomes tightly wedged under elastic tension when the nut thread rib is forced (by reaction of the work on the nut) from the deeper to the shallower side of the bolt thread groove into the position shown in Fig. 3 wherein one side face of the nut thread abuts that side face of the bolt thread which faces away from the entering end of the bolt. The crest surface of the bolt thread and root surface of the nut thread lie parallel with the thread axis from edge to edge of said surfaces.

It will be noted that the conoidal root surface of the bolt thread is of greatest diameter along the edge of the bolt thread groove which is nearest the entering end of the bolt or the reaction taking steep side face of the bolt thread rib. It will also be noted that this conoidal surface slopes inward toward the axis of the cutting circle of the die in a direction opposite to the slope of the customary outwardly flaring throat portions on the die chasers at the leading end or face of the die.

Prior to the present invention, in cutting Dardelet threads it has been the practice to provide the chasers with groove developing ribs profiled to correspond with the profile of the bolt thread groove and also to provide the usual inclined throat at the leading edge of the chaser as in the production of chasers for cutting the ordinary V-thread and other known types of thread, with the result that the rib between the first two grooves of the chaser has a crest surface which either in whole or in part slopes in a direction opposite to the direction of inclination of the throat portion of the chaser. In die cutting threads with such chasers, it has been found that in many cases the dies cut out of round, cut drunken threads, cut threads out of pitch, and cut thread profiles wherein the rib (at least during the first one or two turns of the thread) is narrower than it should be and the groove correspondingly wider than it should be. In using such dies there is a tendency to set up between the stock and die undesirable relative axial and radial vibratory movements resulting in distorted cutting of the thread. It has been found that the present invention overcomes the defects set forth and that, by practicing the invention, accurate threading may be accomplished expeditiously and economically.

According to the embodiment of the present invention shown in Figs. 1, 2 and 4 to 14, inclusive, the set of chasers for the die of whatever type have their grooved faces provided with parallel thread grooves G running in the known manner, each chaser having the usual beveled throat surface T adjacent and along the leading edge thereof intersecting the groove G located nearest the leading edge of the chaser, said grooves all extending to a common base line. The depth of the grooves is preferably such that the root surfaces of the grooves lie entirely outside the periphery of the bolt shank the die is designed to thread, as is usual. The ribs have steep side walls the slope of which corresponds with the slope of the side walls of the bolt thread groove, the included angle in the case of the standard Dardelet thread being twenty-nine degrees, as shown. A plurality of the ribs designated R adjacent the following edge of the chaser are identical in size and profile and have crest surfaces C sloping toward the base line of the grooves from edge to edge of said ribs, the said ribs being of least height at the sides thereof nearest the following edge of the chaser and highest at the sides thereof nearest the throat portion T and the leading edge of the chaser. Between throat portion T and ribs R at least one rib designated R' is provided which is identical with ribs R except that it is lower, its top being cut away to provide a crest surface C' parallel with the base line of the grooves G. This crest surface may extend from steep side wall to steep side wall of rib R' and in most cases does so on all chasers of a set, or all except one chaser of the set. In some cases, due to the angle of surface T to the die axis, the beveled surface T is continued upon a portion of rib R' of at least one chaser. It will be understood that two or more ribs of the type of rib R' may be provided in advance of ribs R, if desired. The surfaces T, C and C' are preferably produced by grinding operations on the grooved face of the chaser.

The die shown in Figs. 1, 2, 4, 5, 6, 7 and 8 is of the type shown in U. S. Patents No. 409,208 and No. 864,964, wherein the chasers 24 are bar-like chasers arranged tangentially to the cutting circle, and the grooves G and ribs R, R' extend parallel with the longitudinal side edges of the chasers, the chasers being canted in the well-known manner so that said ribs and grooves extend at an angle to the axial line of the bolt corresponding with the helix angle of the thread to be cut, and said chasers being rigidly clamped in the die head. Further description of the die head and mounting of the chasers is believed to be unnecessary.

In the improved chasers for the die just described, each chaser 24 also has a beveled or rearwardly relieved cutting face portion F at one end extending transversely of the chaser from the leading edge of the chaser to a point beyond the leading one of the ribs R, said relieved face being produced by grinding one end of the chaser for a portion of the width of the chaser in a plane inclined to the flat back of the chaser, said inclined plane making an angle with the longitudinal side edges of the chaser equal to the helix angle of the thread the chaser is profiled to cut, thus leaving a relatively projecting following portion L the grooves and ribs of which act as a lead screw. When a chaser, having its active end formed as described, is set in the usual position in the die head, as shown in Figs. 1, 2 and 5, the serrated or toothed cutting edge of face portion F extends parallel with the axis of the die and of the bolt or other member being threaded, and end portion L will project beyond the cutting line, thus improving both the cutting and leading in actions of the die on the bolt.

The provision whereby rib R' is interposed between the profile finishing ribs R of each chaser and throat T of the chaser, and whereby face F is extended beyond the leading rib R, also give a wide cutting edge in advance of leader portion L, which is an advantageous feature.

The die shown in Figs. 9, 10 and 11 is constructed as shown in U. S. Patent No. 1,111,412, except that the inner faces of its chasers 25 are profiled, as heretofore described, in accordance with one of the embodiments of the present invention. As shown herein, this die is of the radially arranged chaser bar type wherein the chasers are in effect segments of a nut, the grooves and ribs and beveled throat surface extending across the concave inner end faces of the chaser bars and forming an interrupted cutting thread.

The die shown in Figs. 12, 13 and 14 is constructed as shown in U. S. Patent No. 220,592, except that the ribbed faces of its chasers 26 are profiled, as heretofore described, in accordance with one of the embodiments of the present invention. As shown herein, the chasers 26 of this die are of the recessed cylindrical chaser type wherein the chaser cylinders have annular ribs and grooves parallel with the side edges of the chasers, the chasers being mounted on the die head with their axes canted relatively to the axis of the die as indicated in Fig. 14, and in said patent, so that the ribs and grooves extend back from the cutting faces 27 of the chasers at an angle to the die axis corresponding with the helix angle of the thread to be cut. Cutting faces 27 are formed on the chasers in the usual way by recessing the chasers as shown.

By providing dies embodying the invention in the forms above described, it will be observed that about two turns of an unfinished thread groove will be cut inwardly from the entering end of the bolt before the first rib R of a chaser (the first rib whose profile corresponds with the finished thread groove profile, and the first rib having a crest surface C sloping in the same direction as the root surface of the finished thread) begins the generation of the conoidal root surface of the thread, and it will also be observed that throughout one of these turns the steep side walls of the thread groove will be partly developed by the four ribs R' of the four chasers, which latter ribs owing to their flat crests C' cut the last-mentioned turn of the thread with a bottom surface which extends parallel with the bolt axis widthwise of the thread groove. There is thus presented for finishing cutting by the four following ribs R of the set of chasers a substantially completed groove having its side walls finished to nearly their full depth but having its bottom wall extending parallel to the bolt axis longitudinally of said axis, said bottom wall of the substantially completed groove having no slope in the direction of that of the root surface of the completed thread.

It will thus be seen that the finishing cutting ribs or teeth R, even at the entering end of the bolt, convert a cylindrical root surface into the conoidal root surface of the Dardelet thread, following along in the groove behind cutting ribs or teeth R' which bring the groove progressively to the above substantially completed form in advance of said finishing teeth. By this arrangement the undesirable conditions hereinbefore mentioned are avoided, and threads are cut with greater accuracy. The ribs or teeth R' with non-sloping crest surfaces C' not only present to the action of the finishing ribs or teeth a root surface and side surfaces of such character that undesirable relative endwise vibratory and/or creeping movements between the stock and die are not developed; but the non-sloping crest surfaces of said ribs R' straddle the stock and bear firmly thereon at circumferentially spaced points along lines parallel with the axis of the stock and die and effectively center and steady the stock, these features being especially desirable at the start of the threading of the bolt.

In the embodiment of the invention disclosed in Figs. 15, 16 and 18, the die (including its set of four chasers and their arrangement in the die-head) is of the same construction as that shown in Figs. 1, 2, 4, 5, 6, 7 and 8 and above described, except that the chasers are differently formed at their ribbed faces from their leading side edges to the first or leading one of the ribs R having the profile of the thread groove of the Dardelet thread, i. e. the first rib with an inclined top C. Each of the four chasers 24$^a$, 24$^b$, 24$^c$ and 24$^d$ of this modified form of die has a beveled throat surface T' extending inward from its leading side edge toward the leading one R" of a series of parallel thread ribs R—R" which extend longitudinally of the chaser parallel with the longitudinal side edges of the chaser. Throat surface T" makes the same angle with the flat back of the chaser and with the die axis, and is of the same width, on all four chasers of the die. Throat surface T' on each chaser intersects the common base line B of the series of ribs R—R" of the chaser short of the leading rib R" with which it is connected by a flat or plane surface P coincident with the base line B and the flat bottoms of the grooves G between the chaser ribs.

The several series of ribs on the successive chasers of the set of four chasers are progressively offset from the leading side edges of the chasers in the usual manner so that the active or innermost cutting ends of the ribs will lie in a helical path to form a helical series of cutting teeth when the chasers are assembled in the usual manner in the die head H. Since the flat surfaces P are extended to the leading ribs R" from throat surfaces T' of equal width on all the chasers, these surfaces P progressively increase in width from chaser to chaser of the set, being of least width on the uppermost chaser shown in Fig. 16 and of greatest width on the lowermost chaser shown in Fig. 16, in which view the chasers are shown in the order from top to bottom of the view in which they act to start the progressive development or cutting of the thread profile to its final form.

The thread grooves G of the modified chasers and the ribs R are similar to those of the set of chasers 24, the flat bottoms of said grooves being all equidistant from the flat backs of the chasers, and the ribs R being all of the same height and profile, which profile is identical with that of the thread groove of the external Dardelet self-locking thread. Grooves G are all of the same width at the base, and all the ribs R—R" are also of the same width at the base. The side walls of the several ribs diverge toward the base line of the ribs and (in the construction shown for cutting standard Dardelet threads) each of said walls makes an angle of 14½ degrees with the perpendicular to base line B.

The leading rib R" of each chaser has a flat top wall or crest surface C' lying parallel with the base line B of the series of ribs R—R" of that chaser and also parallel with surface P of the chaser. The height of ribs R" of the several chasers varies on different chasers of the set, rib R" of chaser 24$^a$ being lowest, and ribs R" of chasers 24$^b$ to 24$^d$ being progressively higher. Rib R" of chaser 24$^a$ is preferably made very low as compared with the depth of the thread groove of the Dardelet thread to be cut, and rib R'' of chaser 24ᵈ is of no greater height (and preferably of slightly less height) than the height of ribs R at the lower side edges of the latter ribs, so that the inclined top edge of the leading one of the ribs R on chaser 24ᵃ will complete the development of the Dardelet thread groove by taking a thin cut throughout its width. The tops C of all ribs R of each chaser incline from edge to edge of the ribs in planes at an angle of six degrees to both the base line B of the ribs and the flat back of the chaser, each of said ribs being lowest at the side edge thereof that is farthest from throat surface T' and leading rib R'' of the chaser, so that the throat T' and tops of ribs R are of opposite inclination.

In the die last described, the active or innermost cutting end faces of the modified chasers each has a beveled or relieved cutting end face portion F and a relatively projecting guide end portion or lead-off portion L, with face portion F extending inward from the leading side edge of the chaser to a point beyond the leading one of the ribs R and making an angle with the longitudinal side edges of the chaser equal to the helix angle of the thread the chaser is profiled to cut, so that face portions F extend parallel with the die axis and the axis of the piece being threaded, while portion L slightly projects beyond the line of cut for more efficient action as a guide or lead screw, as indicated in dotted lines in Fig. 15 and as shown and described in connection with the die disclosed in Figs. 1, 2, 4, 5, 6, 7 and 8.

In operation of a die of the construction shown in Figs. 15, 16 and 18, the active or inner ends of the beveled throat surfaces T' of the chasers will act (when necessary) as cutting and guiding edges to center and guide in an oversize piece and taper it down, as shown in Fig. 18.

The active or inner ends of surfaces P of the chasers will straddle and bear on the periphery of the piece being threaded to hold it truly centered and also against vibration, if the piece is of proper nominal size, as shown in Fig. 15; and, if the piece is oversize, said ends of surfaces P will (as shown in Fig. 18) additionally act as cutting edges to bring the oversized piece to cylindrical form of proper nominal diameter in advance of the cutting of any groove, or the starting of a thread groove in the piece, so that the groove developing ribs of the die chasers will always begin to act upon a true cylindrical surface extending parallel to the axes of the die and the piece being threaded.

The cutting ends of the ribs of the series of leading ribs R'' of the die will bring the thread to approximately final form by developing from the very outset a groove with two steep side walls united by a bottom wall which is parallel from edge to edge with the axes of the die and piece, and the flat tops C' of said ribs will serve to aid portions P in holding the piece centered in the die, while the steep side walls of said ribs will serve to prevent relative axial vibrations or reciprocations between the die and piece from the very beginning of the development of the thread on the piece.

These features are highly advantageous and important, as they prevent the setting up of axial and radial vibrations between the die and the piece being threaded at the beginning of the cutting of the thread, when such vibrations would have the greatest effect upon the accuracy of the product. Said features are especially advantageous in connection with the cutting of external Dardelet threads the profile of which is such as to tend to augment the deficiencies of the usual types of dies in the foregoing respects, which deficiencies result frequently in cutting threads that are out of pitch, out of round, and imperfect in profile, especially in the first few turns of the thread inward from the entering end of a bolt or other male piece.

Other highly desirable features of the invention embodied in the modified form of die disclosed in Figs. 15, 16 and 18 are that it provides for cutting the thread to finished and perfect profile to within one turn of the end of the helical cut made in the piece by the die, and delays the generation of the conoidal root surface of the Dardelet thread until the groove is developed to approximately full depth with steep side walls and a broad bottom wall which is parallel with the axes of the die and piece. These features permit cutting a thread of full profile very close to the inner end of the cut made by the die, and prevent the die from tending in operation to pull in the piece being threaded more rapidly than called for by the thread pitch and nominal lead rate of the die and thread (especially at the start of the threading) in such manner as to cause the leading low height ribs or die teeth to crab along the piece and cut out of pitch. It will also be seen that with such a die the thread groove of an external Dardelet thread may be easily cut, since it is cut to approximately full depth by four successive thin cuts, and that the bottom of the groove or the thread root is then brought to finished conoidal form by another thin cut entirely across the groove, the side walls of the thread rib being generated by these cuts.

A die having practically all of the advantages of the last above-described die may be provided by using therein the slightly modified set of chasers shown in Fig. 17 instead of the set of chasers shown in Fig. 16. The chasers 24ᵃᵃ, 24ᵇᵇ, 24ᶜᶜ and 24ᵈᵈ of this modified set of chasers are constructed and operate precisely like the corresponding chasers 24ᵃ, 24ᵇ, 24ᶜ and 24ᵈ shown in Fig. 16, with the exception that the inclined or beveled throat surfaces T¹ of the latter chasers are omitted, and the modified chasers have abrupt leading edge faces E lying perpendicular to the surfaces P and extending from the outer edges of surfaces P to the backs of the chasers. As shown, the usual beveled or undercut clamping surface U provided on chasers of this type at the back of each chaser, is, in the modified chasers shown in Fig. 17, located the same distance from the leading longitudinal side edge of the chaser as in the case of the form of chasers shown in Fig. 16, so that the two forms of chasers may be used in standard or known die heads, or be interchanged in the same die head. By employing the modified chasers shown in Fig. 17, the thread may be carried still closer in its final form to an abrupt shoulder on the piece being threaded than with the chasers shown in Fig. 16.

The present application for patent is a continuation of my applications for patent Serial No. 415,742, filed December 21, 1929, and Serial No. 442,224, filed April 7, 1930.

What I claim is:

1. A chaser for thread cutting dies, having a surface provided with parallel thread grooves with a common base line, the rib between the first and second grooves from the leading edge of the chaser being lower than the following ribs and having steep side walls and a crest surface lying parallel with the base line of the grooves, the said chaser surface adjacent the leading edge of the chaser being beveled in a plane intersecting said crest surface and the outer wall of that groove which is nearest the leading edge of the chaser and crossing the base line of the grooves as it approaches said chaser edge, and said following ribs each having steep side walls extending to the base line of the grooves and a crest surface extending from one side wall to the other at a slight slope relatively to the base line, the direction of slope of said crest surfaces of the following ribs relatively to the base line of the grooves being opposite to the direction of slope of the beveled surface portion of the chaser surface located adjacent the leading edge of the chaser.

2. A chaser for thread cutting dies as claimed in claim 1 wherein the ribs are parallel with the side edges of the chaser, and the chaser has a relieved cutting face extending transversely of the grooves from the leading edge of the chaser to a point beyond at least the leading one of said following ribs, and the cutting edges of said relieved cutting face is so disposed as to lie parallel with the axis of rotation of the die when the chaser is set in cutting position in the die.

3. A thread cutting die having a helical series of thread groove cutting portions including entering throat cutting portions with cutting edges inclined outwardly toward the leading face of the die, followed by cutting portions of greater height having thread root cutting edges parallel with the axis of the die, followed by finishing cutting portions of still greater height having thread root cutting edges inclined in a direction opposite to said first-mentioned cutting edges.

4. A rotary die for cutting external Dardelet screw threads having a plurality of cutting edges spaced around its axis and each extending longitudinally of the axis and having only two thread groove cutting teeth therealong, all of the thread groove cutting teeth of said die having bases of the same width equidistant from the die axis and lying in a common helix, and also having sides making angles with the die axis of equal amplitude, the adjacent sides of the two teeth along each cutting edge being connected by a portion of said edge narrower than the tooth bases and tops and parallel with the die axis, and the leading teeth of said cutting edges increasing in height in the order of their recession from the leading end of the die and having tops parallel with the die axis, while the following teeth of said cutting edges have tops slightly inclined to the die axis and are of greatest height at the sides thereof nearest the leading end of the die and all higher than the highest one of said leading teeth.

5. A rotary die as claimed in claim 4, wherein the teeth with inclined tops are of equal height and are higher at their shorter sides than the highest tooth with top parallel with the die axis.

6. A rotary die for cutting external Dardelet screw threads provided with a plurality of cutter elements having inner ends extending longitudinally of and spaced apart around the die axis, each of which ends is profiled to present a row of thread groove cutting teeth having a base line parallel with the die axis and a pilot cutting edge at the leading end of said row of teeth parallel with the die axis with all the cutting teeth of the die lying in a common helix and the tooth bases and said pilot cutting edges all equidistant from the die axis at the front faces of said cutter element ends, and a plurality of the groove cutting teeth in said helix nearest the leading end of the die increasing in height in the order of their distance from the leading end of said helix and having top cutting edges parallel with the die axis while the remaining groove cutting teeth in said helix are of still greater height and have top cutting edges sloping toward the die axis in the direction of the leading end of the die.

7. A die as claimed in claim 6, wherein each of said pilot cutting edges extends from the leading side of the leading tooth of a row toward the leading end of the die and all said edges terminate in a common plane perpendicular to the die axis.

8. A die as claimed in claim 6, wherein all the teeth with sloping top cutting edges are of the same height and each cutter element has but a single tooth with top cutting edge parallel with the die axis.

9. A multiple cutter element rotary die for cutting external Dardelet screw threads each of the cutter elements of which has an inner end with a front face extending longitudinally of the die axis, said inner ends of said elements being spaced apart around the die axis and each having a row of thread groove cutting teeth spaced apart at their bases and a pilot portion at the leading end of said row of teeth, all the groove cutting teeth of the die lying in a common helix and said ends of said elements having pilot cutting edge portions all parallel with and equidistant from the die axis at the front faces of said ends and all the interdental portions of said ends being parallel with and equidistant from the die axis at the front faces of said ends and the same distance from the die axis as said pilot cutting edge portions, a plurality of the teeth in said helix nearest the leading end of the die having top cutting edges parallel with the die axis and being lower than the remaining teeth which have tops sloping toward the die axis in the direction of the leading end of the die.

10. A die as claimed in claim 9, wherein all the teeth have bases of equal width and identical included angles between their sides which converge toward the tooth tops at equal angles to the die axis, and at least one tooth on each cutter element has a top parallel with the die axis.

11. A multiple cutter element die for cutting external Dardelet screw threads, each of the cutter elements of which has at its inner end a row of teeth spaced apart at their bases and a pilot portion at the leading end of said row, said cutter elements being arranged with their inner ends spaced apart around the die axis and extending longitudinally of the die axis and all the die teeth lying in a common helix with the bases of adjacent teeth of each cutter element connected by an interdental portion, all the interdental portions and pilot portions lying parallel with and equidistant from the die axis, and a plurality of the teeth in said helix nearest the leading end of the helix being lower than the other teeth and having tops parallel with the die axis while the remaining teeth have tops sloping toward the die axis in the direction of the leading end of the die.

12. A die as claimed in claim 11, wherein all the teeth have the same base width and all the interdental portions are of the same width, and all the teeth have sides converging toward their tops at the same angles to the die axis and are of the same height except the leading tooth of each row, the latter teeth increasing in height in the order of their distance from the leading end of the die and being the only teeth with tops parallel with the die axis.

13. A chaser for cutting external Dardelet screw threads having a row of parallel teeth equally spaced at their bases, and pilot and interdental surfaces lying in a common plane, said teeth all having bases of the same width and having sides converging toward their tops with identical included angles between the tooth sides, the tooth nearest the pilot surface being lower than the others and having a top lying in a plane parallel with said common plane, and all the other teeth being of equal height and having tops inclined to said plane with the higher sides of the teeth nearest the pilot portion.

14. A block-like chaser for cutting external Dardelet threads having a front end face, said chaser having parallel equally spaced rib-like teeth and interdental and pilot surfaces at one face thereof all extending to said end face with the interdental surfaces and the pilot surface adjacent the leading tooth lying in a common plane, the leading tooth being lower than the others and having a top parallel with said common plane while the other teeth have tops inclined to said plane with the higher sides of the teeth nearest said leading tooth, all the teeth having the same base width and sides converging at the same angle toward their tops, and said front face having a set back cutting portion extending from the leading side edge of the chaser and terminating between the second and third teeth from said side.

15. A chaser for thread cutting dies one surface of which is grooved to provide a series of parallel thread ribs having a common base line and separated by intervening parallel grooves, the rib between the first and second grooves from the leading side edge of the chaser having a crest surface lying parallel with the common base line of the ribs and also having steep side walls, and each of the ribs which follow said last-mentioned rib being higher than said rib and having two steep side walls which are connected by a crest surface that extends from wall to wall with a slight slope toward said common base line, all of which sloping crest surfaces incline in the same direction.

16. A thread cutting die having a helical series of successively acting thread cutting teeth around the die axis, which series of teeth includes all of the thread cutting teeth of the die and comprises one or more teeth having a top cutting edge extending longitudinally of and parallel to the die axis, and one or more final cutting teeth extending closer to the die axis than, and immediately following, the last-mentioned tooth or teeth and having a top cutting edge extending longitudinally of the die axis and inclining toward the die axis in the direction of the leading end of the die.

17. A thread cutting die having leading cutting teeth followed by final cutting teeth which are provided with steep side cutting edges and a thread root finishing top cutting edge connecting their side cutting edges and inclining slightly toward the die axis in the direction of the leading end of the die, said leading and final teeth having their bases equidistant from the die axis and all being spaced around the die axis in a common helical path of such small pitch relatively to the thickness of the final cutting teeth that the latter teeth finish the cut thread with a thickness exceeded by the width of the thread groove, each final cutting tooth having a profile large enough to include the profile of each one of said leading teeth, and each leading tooth in at least one convolution of said helical path immediately in advance of the leading one of said final cutting teeth having side cutting edges and also having a top cutting edge which extends parallel to the die axis.

18. A bar chaser of the tangential cutting type having a flat back cut away along one longitudinal edge of the chaser to provide an undercut longitudinal clamping shoulder for reception in a holder, and having opposite said back a flat face grooved longitudinally to provide a plurality of parallel ribs whose bases lie in a common plane that is parallel to said flat back of the chaser, said ribs extending to opposite end faces of the chaser, one of which end faces is beveled for a portion only of the width of the chaser from the leading longitudinal edge of the chaser to provide a leading cutting end face portion and a following non-cutting end face portion, the leading rib or ribs only of those ribs which extend to the cutting end portion being lower than the remaining ribs extending to the cutting and non-cutting end face portions, each of said remaining ribs having steep side faces connected by a flat top face which is inclined relatively to the flat back of the chaser and slopes away from said flat back of the chaser in the direction of the leading longitudinal edge of the chaser, and the lower rib immediately in advance of said remaining ribs having a flat top surface lying in a plane parallel to the plane of the back of the chaser.

19. A chaser as claimed in claim 18, in which the grooves between the parallel ribs have flat bottom walls connecting the bases of the ribs and lying in a common plane parallel to the plane of the flat back of the chaser, and in which the cutting end face portion of the chaser has a cutting edge lying in said plane and extending from the base of the leading rib toward the leading longitudinal edge of the chaser.

20. A thread cutting die having a plurality of serrated chasers, in which the cutting faces of all the cutting teeth provided by the chaser serrations are spaced around the die axis in a common helical path, in which path there is at least one cutting tooth on each chaser having side cutting edges disposed steeply to the die axis and a top cutting edge parallel to the die axis, which teeth are immediately followed in said path by one or more final cutting teeth having side cutting edges disposed steeply to the die axis and connected by a top cutting edge inclined toward the die axis in the direction of the leading end of the die and extending closer to the die axis than the said top cutting edges of the first-mentioned teeth.

21. A screw thread cutting die all of whose thread cutting teeth are arranged in a helical path around the die axis to cut sucessively, characterized in that the tooth which cuts behind all the others has a top cutting edge which slopes toward the die axis in the direction of the leading end of the die, and in that certain of the teeth which cut in advance of the aforesaid tooth have a top cutting edge which is displaced farther from the die axis than the top cutting edge of the aforesaid tooth and lies parallel to the die axis, the extent of displacement from the die axis of the said top edges of the latter teeth being different for each tooth.

22. A screw thread cutting die all of whose thread cutting teeth are arranged in a helical path around the die axis to cut successively, characterized in that the tooth which cuts behind all the others has a top cutting edge which slopes toward the die axis in the direction of the leading end of the die, and in that certain of the teeth which cut in advance of the aforesaid tooth have a top cutting edge which is displaced farther from the die axis than the top cutting edge of the aforesaid tooth and lies parallel to the die axis, the extent of displacement from the die axis of the said top edges of the latter teeth being different for each tooth and decreasing from tooth to tooth in the order in which said teeth cut.

23. A screw thread cutting die according to claim 21, in which the teeth whose top cutting edges lie parallel to the die axis are the leading teeth in said helical path.

ROBERT THOMSON.